United States Patent [19]

Welker

[11] Patent Number: 4,574,009

[45] Date of Patent: Mar. 4, 1986

[54] GOB ARRIVAL SENSOR FOR A GLASS FORMING MACHINE

[75] Inventor: Mathias P. Welker, Toledo, Ohio

[73] Assignee: Owens-Illinois, Inc., Toledo, Ohio

[21] Appl. No.: 689,350

[22] Filed: Jan. 7, 1985

[51] Int. Cl.⁴ .............................................. C03B 7/08
[52] U.S. Cl. ...................................... 65/158; 65/160;
    65/164; 250/224; 356/386
[58] Field of Search ................ 65/160, 163, 164, 158,
    65/318; 250/224; 356/386

[56] References Cited

U.S. PATENT DOCUMENTS

| | | | |
|---|---|---|---|
| 3,293,017 | 12/1966 | Jenkins | 65/164 X |
| 3,822,945 | 7/1974 | Robinson et al. | 356/386 |
| 4,162,909 | 7/1979 | Peters | 65/164 X |
| 4,205,973 | 6/1980 | Ryan | 65/164 |

*Primary Examiner*—Arthur Kellogg
*Attorney, Agent, or Firm*—John R. Nelson

[57] ABSTRACT

Apparatus for sensing the passage of a gob of molten glass through a gob deflector or gob guide wherein a quick-disconnect nipple is fixed in a radial opening adjacent the lower end of the gob deflector. A hollow, quick-disconnect housing which is adapted to fit over the nipple is formed with a longitudinal passage therethrough, a washer-shaped holder lying in a plane, normal to the axis of said passage and intermediate the ends thereof serves to support a phototransistor with its leads extending into an end of the passage. A radial hole in the side of said housing has an elongated armored, stainless steel cable fixed thereto and an elongated high temperature insulating sleeve covering a pair of Teflong insulated wires extends within the cable with one of the wires connected to the emitter lead on said transistor and the other wire to the collector lead on the transistor. A high temperature epoxy fills the end of the housing about the wire connections with a plug closing the end of said housing containing said epoxy and a two pin connector plug connected to the other end of the wires.

6 Claims, 3 Drawing Figures

GOB ARRIVAL SENSOR FOR A GLASS FORMING MACHINE

BACKGROUND OF THE INVENTION

In the operation of electronic timing systems for modern glass container forming machines, it has become important that the precise time of arrival of an individual gob of molten glass at the molds be detected. With the advent of glass forming machines in which the machine may have as many as ten independent sections with each section having four parison molds, the success of operating the machine in the most efficient manner so that there will not be excessive periods of dead time when being advanced, requires that the time of arrival of each individual gob at its parison mold be known with precision.

The gob arrival will in many cases dictate the precise instant when the next step in the forming process may be started. The mechanisms that come into play, such as removal of a guide funnel and seating of a baffle, all require that the gob of glass will have arrived at the mold. In many of the multiple cavity machines where the mechanisms operate in unison, because they are all physically interrelated, requires that the "last to arrive" of the plurality of gobs in a single section be known with precision.

In the past, and as disclosed in U.S. Pat. No. 4,162,909 issued July 31, 1979, the gob arrival sensors consisted of a phototransistor mounted in a housing made of a phenolic material, with an opening of about one-eighth inch in the housing serving as the "window" through which the gob path is viewed. A standard BNC connector is connected to the housing. The connection from connector to the machine logic and timing circuits is not revealed.

In a glass forming machine of the type which forms gobs of molten glass into articles such as bottles will normally have the gobs fed to it by gravity from an overhead gob former and feeder. The gobs, as they are made, will be distributed to the sections of the machine in a predetermined sequence, and in the travel of an individual gob to a particular parison mold, the gob is normally guided to the central axis of the mold by a generally vertical gob guide. An example of a gob guide is that shown in U.S. Pat. No. 3,585,018 dated June 15, 1971 as element 11. In some machines the gob may fall through a curved deflector just prior to entry into the mold. In the present case the term gob guide is to include any gob directing means which is just in advance of the parison mold.

One of the most critical deficiencies in existing gob sensing systems is that they are subject to failure because of the hostile environment in which they are required to operate and the lack of protection for the sensor, as well as the accessing equipment, including leads from the sensor to the section computer.

SUMMARY OF THE INVENTION

A phototransistor or other radiant energy sensing element is centrally mounted in a housing by a non-conductive holder, the housing is filled, behind the phototransistor and holder, with a potting compound and a plug overlies the opening through which the compound was inserted in the housing. The housing is connected to a nipple that is threaded in a gob guide by a quick-disconnect feature. The leads extend coaxially through a sleeve which has a cable cover capable of withstanding fairly high temperatures such as may be encountered from a glancing blow of a gob of molten glass at 1000° F.–1400° F.

It is one of the prime objects of this invention to provide a gob arrival sensor which is protected from the inherently dirty, wet and obviously hot environment in which the sensor must be positioned.

DETAILED DESCRIPTION OF THE DRAWINGS

Figure 2:
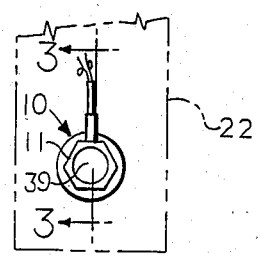
FIG. 2 is an end view of the sensor of FIG. 1.
Figure 1:
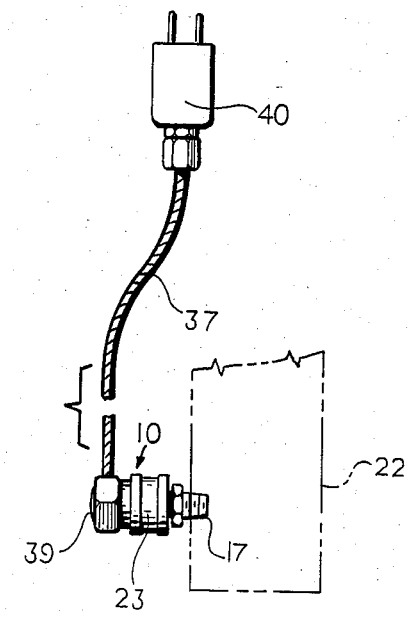
FIG. 1 is a side elevational view of the sensor of the invention.
Figure 3:
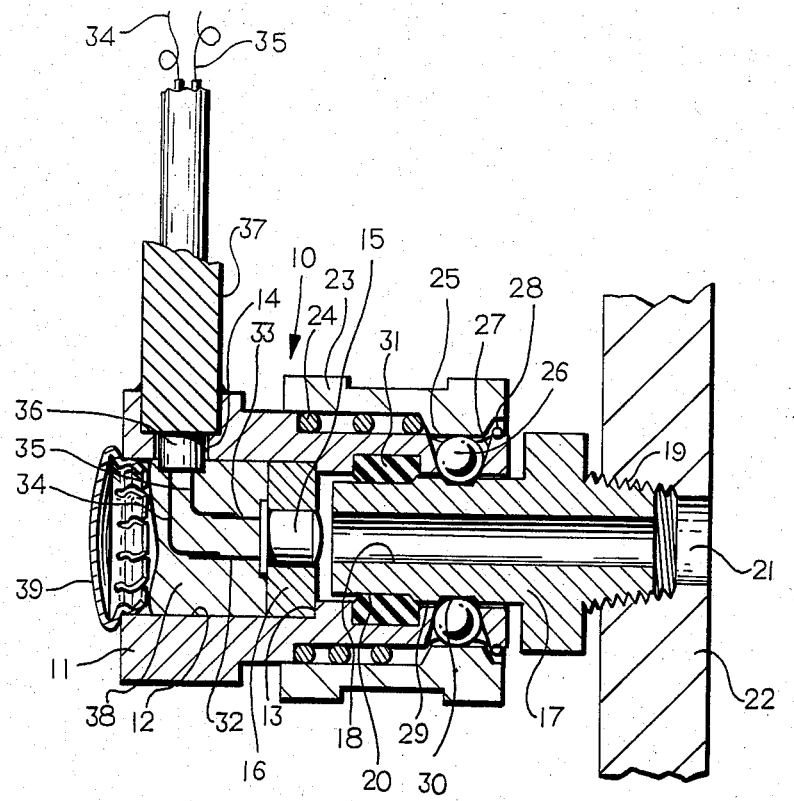
FIG. 3 is an enlarged, cross-sectional view taken at line 3—3 of FIG. 2.

With reference to the drawings, the gob arrival sensor of the invention includes a quick disconnect coupler 10, manufactured by Snap-tite, Inc., and sold under catalog No. PHC-4-4-F. The coupler is an annular metallic member 11, which is altered to provide a bore 12 extending from the left, as shown in FIG. 3, to a shoulder 13. A radially extending opening 14 is drilled through the wall of the coupler 10 to open into the bore 12 thereof. A phototransistor 15 is fixed centrally of the bore 12 by a holder 16 formed of a high pressure laminated rod with a hole drilled therethrough to provide the seat for the transistor. The right hand end, as viewed in FIG. 3, of the phototransistor is transparent for receiving light directed thereto through a nipple 17 having a passage 18 extending axially therethrough. The nipple 17 is formed at one end with tapered threads 19 and at the opposite end with a plane, cylindrical surface 20. The threaded end 19 of the nipple 17 is adapted to be threaded into a tapped hole 21 in the side of a vertical gob guide 22.

A typical gob guide is illustrated in U.S. Pat. No. 3,585,018 dated June 15, 1971 at 11.

As previously explained, the gobs that are being fed to glass forming molds must pass through the tube-like gob guide as they fall by gravity from the glass feeder where the gobs are formed. Each mold will have an individual gob guide and it is the passage of the gob through this guide that the gob sensor is to detect. The gob guides on a machine will be of a size which is determined by the particular bottle being made and the diameter of the gob.

The gob size and diameter may change from job to job and therefore a particular forming machine may have the gob guides changed as the jobs change. In the case of a 10 section quadruple gob machine, this would entail at least 40 individual gob guides for a particular job setup. When the job is changed and the gob size is different, requiring a change in parison molds, a whole new set of gob guides will have to be replaced for the existing ones. When this occurs on an electronically timed and controlled machine, the gob arrival sensors of the present invention must be applied to each of the gob guides. Thus, by having nipples already fixed to the gob guides, very little time is required to reconnect the gob sensor to the nipples on the new guides. The nipples thread into the guides to a distance less than the full thickness of the guide.

The coupler 10 carries a clamping sleeve 23 which is biased by a helical spring 24 toward the right, as viewed in FIG. 3. The internal diameter of the sleeve is reduced at 25 so as to restrain an annular series of ball bearings 26, carried in tapered holes 27 in the metal member 11, to the position shown. The sleeve 23 is prevented from sliding off the member 11 by a retainer ring 28. Movement of the sleeve 23 to the left against the spring 24 will permit the balls to move radially outward to the extent that their surfaces will permit easy entry of the surface 20 and a ridge 29 of the nipple 17 to pass by and enter the bore of the coupler member 11. Release of the sleeve 23 will force the balls 26 to seat within an annular recess 30 in the nipple 17. The nipple will then be coupled to the coupler and the phototransistor 15 will be responsive to the light or radiation which passes through the passage 18 of the nipple 17 when the leading edge of a gob arrives in line with the tapped hole 27 in the gob guide. The barrel or cylindrical surface 20 of the nipple 17 when inserted into the coupler 10 will be surrounded by a flexible rubber sleeve-like washer 31 and thus there is no possibility of any stray light penetrating to the phototransistor 15 except through the passageway 18.

The phototransistor 15 has a pair of leads 32 and 33 extending out the back thereof to which are soldered the stripped ends of a pair of ceflon-coated wires 34 and 35. The wires 34 and 35 are surrounded by a silicone rubber-coated glass fiber braided sleeve 36, which in turn is surrounded by a stainless steel armored cable 37. The end of the cable 37 is seated within the counterbored opening 14 in the housing or member 11 and silver soldered.

With the leads 32 and 33 soldered to the wires 34 and 35, the bore 12 is filled with a potting compound 38 and the opening closed by a plug or crimped cap 39. In this manner the entire sensor, its housing and the leads thereto are protected from intrusion by moisture or dirt, yet the sensor may be quickly removed from the nipple and reapplied as desired.

The end of the cable 37 with enclosed wires may have a plug-in unit 40 at its other end for convenient connection to the section control module which will be remote from the more severe environment of the forming machine.

While the foregoing sets forth the best mode contemplated for carrying out the invention, it should be apparent that slight modifications may be resorted to without departing from the spirit and scope of the invention as set forth in the appended claims.

What is claimed:

1. In apparatus for sensing the passage of a gob of molten glass through a gob deflector or guide, the improvement comprising, a nipple fixed in and extending from a radial opening adjacent the lower end of the gob deflector, a hollow, quick-disconnect housing adapted to fit over said nipple, said housing being formed with a longitudinal passage therethrough with the quick-disconnect feature forming one end of the passage, a washer-shaped spacer lying in a plane, normal to the axis of said passage and intermediate the ends thereof, a phototransistor with a pair of leads mounted in an opening in said spacer with its leads extending into the other end of said passage, an elongated cable, an elongated high temperature insulating sleeve, a pair of insulated wires within said insulating sleeve, said wire containing sleeve extending within said housing with one end of said wires positioned in said other end of said housing, means connecting the wires to said transistor leads, a plug closing the opening in the other end of said housing, and means connecting the other end of said wires to a gob arrival signal device.

2. The apparatus of claim 1, further including, radial opening means formed in the side of said housing adjacent said other end, and means securing one end of said cable in said opening means.

3. The apparatus of claim 2, wherein said cable is a stainless steel armored cable and said securing means is by soldering the end of the cable to the housing.

4. The apparatus of claim 3, further including a potting compound filling the area in said other end of the housing about the wire connections.

5. The apparatus of claim 4, wherein said potting compound is a high temperature epoxy.

6. The apparatus of claim 5, wherein said means connecting the other end of said wires to a gob arrival signal device comprises a pin connector plug.

* * * * *